US012591542B2

(12) United States Patent
Cao et al.

(10) Patent No.: US 12,591,542 B2
(45) Date of Patent: Mar. 31, 2026

(54) DIRECTORY METADATA OPERATION METHOD AND APPARATUS, ELECTRONIC DEVICE, AND READABLE STORAGE MEDIUM

(71) Applicant: Beijing Baidu Netcom Science Technology Co., Ltd., Beijing (CN)

(72) Inventors: Biao Cao, Beijing (CN); Jielong Jian, Beijing (CN); Yan Xing, Beijing (CN)

(73) Assignee: BEIJING BAIDU NETCOM SCIENCE TECHNOLOGY CO., LTD. (CN)

( * ) Notice: Subject to any disclaimer, the term of this patent is extended or adjusted under 35 U.S.C. 154(b) by 0 days.

(21) Appl. No.: 18/989,051

(22) Filed: Dec. 20, 2024

(65) Prior Publication Data

US 2025/0209039 A1     Jun. 26, 2025

(30) Foreign Application Priority Data

Dec. 20, 2023     (CN) .......................... 202311768024.7

(51) Int. Cl.
| G06F 16/00 | (2019.01) |
| G06F 16/13 | (2019.01) |
| G06F 16/14 | (2019.01) |

(52) U.S. Cl.
CPC ............ *G06F 16/13* (2019.01); *G06F 16/148* (2019.01)

(58) Field of Classification Search
None
See application file for complete search history.

(56) References Cited

U.S. PATENT DOCUMENTS

| 11,500,817 B2 * | 11/2022 | Duttagupta ............. G06F 16/13 |
| 11,562,034 B2 * | 1/2023 | Arikatla ................ G06F 16/188 |
| 11,770,447 B2 * | 9/2023 | Joseph ................ H04L 43/0811 |
| | | 709/219 |
| 12,182,264 B2 * | 12/2024 | Sinha ................... G06F 11/1464 |
| 12,242,455 B2 * | 3/2025 | Kotwal ............... G06F 16/2291 |
| 12,248,435 B2 * | 3/2025 | Sinha ................... G06F 16/1734 |
| 2008/0046445 A1 * | 2/2008 | Passey .................... G06F 16/13 |
| 2009/0249249 A1 * | 10/2009 | Glein ........................ G06F 8/38 |
| | | 715/810 |

(Continued)

FOREIGN PATENT DOCUMENTS

| CN | 104537017 B | 5/2018 |
| CN | 114756509 B | 3/2023 |
| CN | 116361287 A | 6/2023 |

*Primary Examiner* — Hasanul Mobin
(74) *Attorney, Agent, or Firm* — Dilworth IP, LLC

(57)     ABSTRACT

A directory metadata operation method, including: in response to receiving a directory query request, obtaining a query path carried therein; obtaining a prebuilt prefix directory data table and a prebuilt full load directory data table, where a key of the prefix directory data table is a prefix path of the directory metadata, which is a subpath corresponding to a hierarchy other than a default hierarchy counting from end in a path corresponding to the directory metadata, a value of the prefix directory data table is the directory metadata, a key of the full load directory data table is identification information of the directory metadata and a value thereof is the directory metadata; determining a matching result between the query path and the key of the prefix directory data table; and determining a query result based on the matching result and the full load directory data table.

16 Claims, 6 Drawing Sheets

(56)　　　　References Cited

U.S. PATENT DOCUMENTS

| 2013/0297657 | A1* | 11/2013 | Chinchwadkar .... | G06F 16/9027 |
| | | | | 707/E17.012 |
| 2015/0228062 | A1* | 8/2015 | Joshi ..................... | G06V 10/58 |
| | | | | 382/110 |
| 2021/0112034 | A1* | 4/2021 | Sundararajan ........ | H04L 47/125 |
| 2021/0248107 | A1* | 8/2021 | Hou ...................... | G06F 3/0652 |
| 2021/0349853 | A1* | 11/2021 | Duttagupta ........... | G06F 16/162 |

* cited by examiner

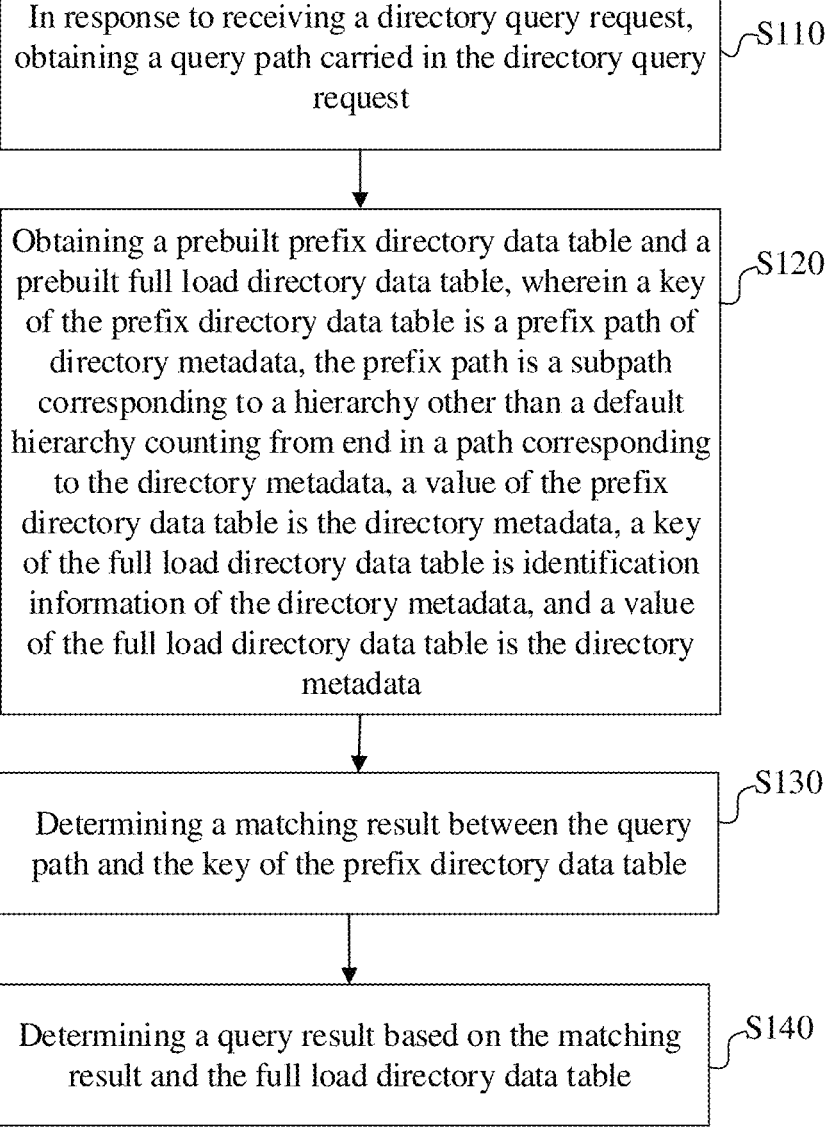

In response to receiving a directory query request, obtaining a query path carried in the directory query request    ⟋S110

Obtaining a prebuilt prefix directory data table and a prebuilt full load directory data table, wherein a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata    ⟋S120

Determining a matching result between the query path and the key of the prefix directory data table    ⟋S130

Determining a query result based on the matching result and the full load directory data table    ⟋S140

FIG. 1

DIRECTORY METADATA OPERATION METHOD AND APPARATUS, ELECTRONIC DEVICE, AND READABLE STORAGE MEDIUM

CROSS-REFERENCE TO RELATED APPLICATION

This application claims priority to Chinese Patent Application No. 202311768024.7, filed on Dec. 20, 2023, which is hereby incorporated by reference in its entirety.

TECHNICAL FIELD

The present disclosure relates to the field of data processing technology and, in particular, to the field of cloud computing, metadata management, and distributed file system technologies. Specifically, the present disclosure relates to a directory metadata operation method and apparatus, an electronic device, and a readable storage medium.

BACKGROUND

A file management in a distributed file system is mostly based on directory metadata. The directory metadata is stored in a certain storage format.

In the use of the distributed file system, an operation of the directory metadata accounts for an important proportion in an operation of the entire distributed file system. At present, the operation of the directory metadata has the problem of low efficiency.

SUMMARY

To solve at least one of the above-mentioned deficiencies, the present disclosure provides a directory metadata operation method and apparatus, an electronic device and a readable storage medium.

According to a first aspect of the present disclosure, a directory metadata operation method is provided, where the method includes:

in response to receiving a directory query request, obtaining a query path carried in the directory query request;

obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

determining a matching result between the query path and the key of the prefix directory data table;

determining a query result based on the matching result and the full load directory data table.

According to a second aspect of the present disclosure, a directory metadata operation apparatus is provided, where the apparatus includes:

a directory query request receiving module, configured to, in response to receiving a directory query request, obtain a query path carried in the directory query request;

a data table obtaining module, configured to obtain a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

a prefix matching module, configured to determine a matching result between the query path and the key of the prefix directory data table;

a query result determining module, configured to determine a query result based on the matching result and the full load directory data table.

According to a third aspect of the present disclosure, an electronic device is provided, where the electronic device includes:

at least one processor; and a memory connected to the at least one processor in a communication way;

where the memory stores instructions executable by the at least one processor, and the instructions, when executed by the at least one processor, enable the at least one processor to execute the above-mentioned directory metadata operation method.

According to a fourth aspect of the present disclosure, a non-transitory computer-readable storage medium having stored therein computer instructions is provided, where the computer instructions are used to enable a computer to execute the above-mentioned directory metadata operation method.

According to a fifth aspect of the present disclosure, a computer program product is provided, where the computer program includes a computer program which, when executed by a processor, implements the above-mentioned directory metadata operation method.

It should be understood that the content described in this part is not intended to identify critical or significant features of embodiments of the present disclosure, and is not used to limit the scope of the present disclosure. Other features of the present disclosure will become easily understood by the following description.

BRIEF DESCRIPTION OF DRAWINGS

The accompanying drawings are used to better understand the present solution and do not constitute a limitation of the present disclosure.

FIG. 1 is a schematic flowchart of a directory metadata operation method provided by an embodiment of the present disclosure.

DESCRIPTION OF EMBODIMENTS

Figure 2:
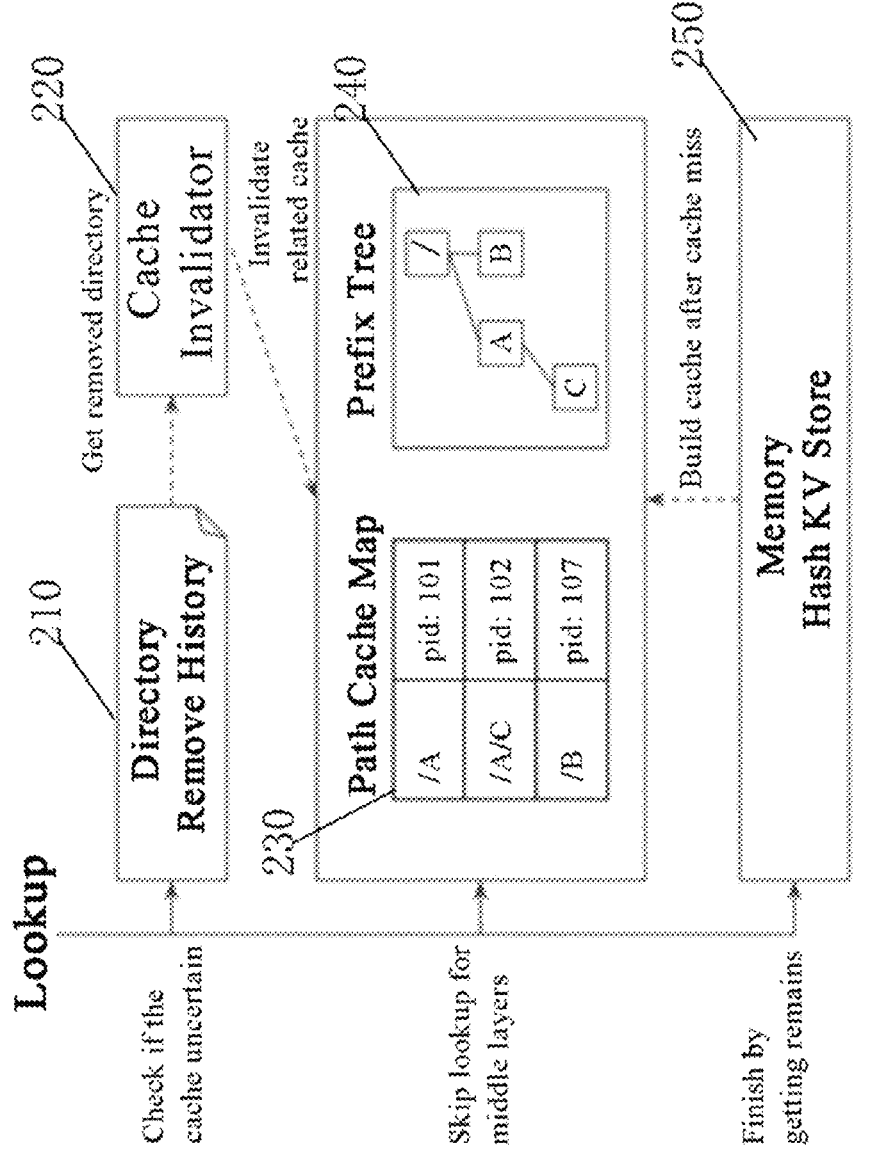
FIG. 2 is a schematic diagram of a data structure involved in a solution provided by an embodiment of the present disclosure.

Exemplary embodiments of the present disclosure are illustrated below in conjunction with the accompanying drawings, including various details of embodiments of the present disclosure to facilitate understanding, which should be considered as merely exemplary. Therefore, persons of ordinary skill in the art should recognize that various changes and modifications may be made to the embodiments described herein without departing from the scope and spirit of the present disclosure. Similarly, for clarity and conciseness, description of well-known functions and structures are omitted in the following description.

When using a distributed file system, it is often necessary to perform an operation on directory metadata. At present, the operation of the directory metadata has the problem of low efficiency.

The operation of the directory metadata includes a looking up (look up) operation, a renaming (rename) operation, and a deleting operation. The looking up operation is the most basic operation. To improve the efficiency of the directory metadata operation, the efficiency of the looking up operation needs to be guaranteed. The looking up operation involves frequent path resolution. The efficiency of the path resolution directly affects the efficiency of looking up operation.

In related technology, there are generally the following two solutions for storing directory metadata. In solution 1, a full path of the directory metadata is used as a key, and the directory metadata is used as a value. In solution 2, identification information of the directory metadata is used as a key, and the directory metadata is used as a value. The identification information of the directory metadata may be a node identification, a directory, or a file name of the index node.

In the above-mentioned solution 1, since the full path of the directory metadata is used as the key, when a query operation is performed, the queried directory metadata can be directly located according to the full path, resulting in fewer path resolution times and higher query operation efficiency. However, in Solution 1, when involving a directory change operation, for example, a cross-directory renaming operation, the keys corresponding to all paths affected needs to be modified, which is very costly.

In the above-mentioned solution 2, since identification information of the directory metadata is used as a key, when involving the renaming operation, only keys of a target node and a parent node involved need to be modified, resulting in high operation efficiency. However, in Solution 2, when involving a query operation, the path resolution needs to be performed layer by layer according to a hierarchy of the query path, resulting in a higher cost of the path resolution.

It can be seen that both the above-mentioned solution 1 and solution 2 have the problem of low efficiency during the directory metadata operation.

The directory metadata operation method and apparatus, the electronic device, and the readable storage medium provided by the embodiments of the present disclosure are intended to address at least one of the above technical problems of the prior art.

FIG. 1 shows a schematic flowchart of a directory metadata operation method provided by an embodiment of the present disclosure. As shown in FIG. 1, the method can mainly include:

step S110: in response to receiving a directory query request, obtaining a query path carried in the directory query request;

step S120: obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

step S130: determining a matching result between the query path and the key of the prefix directory data table;

step S140: determining a query result based on the matching result and the full load directory data table.

In an embodiment of the present disclosure, a prefix directory data table and a full load directory data table can be prebuilt, and the full load directory data table is a built data table that contains the full load directory metadata by using the identification information of the directory metadata as the key and the directory metadata as the value. As an example, the identification information of the directory metadata may include a node identification, a directory name, or a file name.

The prefix path is the subpath corresponding to the hierarchy other than the default hierarchy counting from end in the full path corresponding to the directory metadata. As an example, the default hierarchy counting from end may be last three hierarchies. For example, the full path of the directory metadata is "/a/b/c/d/e/f/g/h/i/j/k", and the subpath of the last three hierarchies is "i/j/k". The subpath is removed from the full path to obtain the prefix path which is "/a/b/c/d/e/f/g/h/".

The prefix directory data table is a built data table that contains part of the directory metadata by using the prefix path of the directory metadata as the key and the directory metadata as the value.

In an embodiment of the present disclosure, the operational efficiency of the query operation can be effectively improved by maintaining the prefix directory data table and the full load directory data table.

Specifically, when querying the directory metadata based on the query path carried in the directory query request, the query path can be first matched with the key of the prefix directory data table to determine the matching result, and based on the matching result and the full load directory data table, the query result is determined.

The query operation is performed based on the prefix directory data table and the full load directory data table, which can effectively reduce the path resolution times in the query operation and improve the efficiency of the query operation.

In an embodiment of the present disclosure, since the full load directory data table is maintained, when performing the directory metadata change operations, such as the renaming operation and the deleting operation, a key of a target node or a parent node of the target node involved can be directly modified in the full load directory data table, and the operation efficiency is high.

In the solution provided by an embodiment of the present disclosure, the operation of the directory metadata is realized by the prefix directory data table and the full load directory data table, which can both improve the query efficiency of the directory query operation and reduce the change cost during the directory change operation, effectively improving the efficiency of the directory metadata operation and improving the system performance.

The method provided by the embodiment of the present disclosure implements the following: in response to receiving a directory query request, obtaining a query path carried in the directory query request; obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata; determining a matching result between the query path and the key of the prefix directory data table; and determining a query result based on the matching result and the full load directory data table. In the present solution, the directory metadata operation is implemented by using the prefix directory data table and the full load directory data table, which can effectively improve the efficiency of the directory metadata operation.

The present solution can be applied to directory tree management in the distributed file system. A directory tree operation request (such as a query request) can be initiated by a client, and the directory tree operation request is responded by the directory tree server.

In an embodiment of the present disclosure, a number of hierarchy of the default hierarchy counting from end may be set according to the actual situation. As an example, in this solution, the number of hierarchies in the default hierarchy counting from end is set to 3. Through the statistics of the directory tree with a large number of directories, it is found that in general, the directory trees of the last three hierarchies account for about 95% of the total directory, and correspondingly, the directories before the last three hierarchies account for about 5% of the total directory. Therefore, the prefix subpath before the last three hierarchies is used as a key to build the prefix directory data table has less data overhead, and in general, the number of the renaming operations of the directories before the last three hierarchies accounts for a relatively low proportion of the whole number of the operations, therefore, there is no need to modify the prefix directory data table frequently.

In an implementation of the present disclosure, the determining the matching result between the query path and the key of the prefix directory data table includes:

determining whether the prefix path in the key of the prefix directory data table contains a target prefix path, where the target prefix path is a subpath corresponding to a hierarchy other than a default hierarchy counting from end in the query path;

in response to the prefix path containing the target prefix path, determining the matching result to be a successful matching;

in response to the prefix path not containing the target prefix path, determining the matching result to be an unsuccessful matching.

In an embodiment of the present disclosure, the target prefix path can be extracted from the query path, and the target prefix path is the subpath corresponding to the hierarchy other than the default hierarchy counting from end in the query path.

As an example, the default hierarchy counting from end may be the last three hierarchies. For example, the query path is "/a/b/c/d/e/f/" and the subpath of the last three hierarchies is "d/e/f". The subpath is removed from the full path to obtain the target prefix path to be "/a/b/c/".

The target prefix path can be matched with the key in the prefix directory data table, that is, determining whether the target prefix path exists in the prefix path of the prefix directory data table, if so, the matching result is successful matching; if not, the matching result is unsuccessful matching.

In an implementation of the present disclosure, in response to the matching result being the successful matching, the determining the query result based on the matching result and the full load directory data table includes:

determining prefix directory metadata corresponding to the target prefix path;

successively querying each hierarchy of the directory metadata below the prefix directory metadata in the query path from the full load directory data table, and determining the query result.

In an embodiment of the present disclosure, when the matching result is the successful matching, that is, the target prefix path exists in the prefix path of the prefix directory data table, the directory metadata corresponding to the target prefix path is recorded as the prefix directory metadata, and the successful matching indicates that the prefix directory metadata exists in the full load directory metadata.

The prefix directory metadata can be understood as first pre-default hierarchy of the directory metadata in the directory metadata to be queried. After the prefix directory metadata is determined, it can start from the next hierarchy of the prefix directory metadata in the query path, and adopt the identification information of corresponding hierarchy of the directory metadata to query from the full load directory data table to determine whether the same identification information exists in the key of the full load directory data table; until identification information of a certain hierarchy of the directory metadata is not queried or identification information of last hierarchy of the directory metadata is queried in the query path. If the identification information of a certain hierarchy of the directory metadata is not queried, the query result is regarded as a failure query. If the identification information of the last hierarchy of the directory metadata is queried in the query path, a successful query is indicated, and then the last hierarchy of the directory metadata is obtained and regarded as the query result from the full load directory data table.

As an example, the default hierarchy counting from end can be the last three hierarchies, and the query path has the total of ten hierarchies. When the directory metadata to be queried exists in the full directory data table, if the full load directory data table is queried layer by layer, ten query operations are required, involving ten path resolution. However, by using the solution provided by the embodiment of the present disclosure, only the target prefix path needs to be resolved first, the prefix directory data table is queried, and then the path resolution is proceeded respectively for each hierarchy subpath after the target prefix path in the query path, and the full load directory data table is queried layer by layer, that is, three path resolution is involved. Therefore, a total of four path resolutions and four queries are required for the solution provided by the embodiment of the present disclosure, which greatly improves the query efficiency and improves the system performance, compared with the ten path resolutions and ten queries proceeded directly in the full load directory data table.

In an implementation of the present disclosure, in response to the matching result being the unsuccessful matching, the determining the query result based on the matching result and the full load directory data table includes:

querying the full load directory data table based on the query path, and determining the query result.

In an embodiment of the present disclosure, when the matching result is the unsuccessful matching, that is, the target prefix path does not exist in the prefix path of the prefix directory data table, if the prefix directory data table contains all the prefix paths, the query result can be determined as a failure query; and if the prefix directory data table does not contain all prefix paths, that is, when the prefix directory data table has incomplete information, the query can be proceeded to the full load directory data table based on the query path.

Specifically, the query path contains identification information of each hierarchy of the directory metadata. It can start from the first hierarchy below a root hierarchy of the query path, and adopt the identification information of the corresponding hierarchy of the directory metadata layer by layer for querying from the full load directory data table, to determine whether the key of the full load directory data table exists the same identification information; until identification information of a certain hierarchy of the directory metadata is not queried or identification information of last hierarchy of the directory metadata is queried in the query path. If the identification information of the certain hierarchy of the directory metadata is not queried, the query result is regarded as a failure query. If the identification information of the last hierarchy of the directory metadata is queried in the query path, a successful query is indicated, and then the last hierarchy of the directory metadata is obtained and regarded as the query result from the full load directory data table.

In an implementation of the present disclosure, after determining the query result, the above-mentioned method further includes:

in response to the matching result being the unsuccessful matching and the query result being that the directory metadata corresponding to the query path is queried, creating a corresponding entry in the prefix directory data table based on the query result.

In an embodiment of the present disclosure, when the matching result is the unsuccessful matching and the query result is that the directory metadata corresponding to the query path is queried, it indicates that the queried directory metadata exists in the full load directory metadata, but the prefix path of the path corresponding to the directory metadata does not exist in the prefix directory data table. At this time, the corresponding entry can be created in the prefix directory data table to achieve the new addition of the data in the prefix directory data table.

Specifically, the prefix path can be extracted from the path corresponding to the queried directory metadata, and the extracted prefix path can be regarded as the key, and the directory metadata corresponding to the prefix path can be regarded as the value, and the corresponding entry can be created in the prefix directory data table.

In an embodiment of the present disclosure, the overhead of creating prefix directory data table can be greatly saved by the manner of updating the prefix directory data table based on query result.

In an implementation of the present disclosure, the above-mentioned method further includes:

updating a prebuilt prefix tree based on the query result, where the prefix tree is a subtree of a directory tree corresponding to the directory metadata in the prefix directory data table.

In an embodiment of the present disclosure, the prefix tree can also be maintained, and the prefix tree can be understood as a subtree of the directory tree corresponding to all directory metadata in the prefix directory data table.

The prefix tree can be used to manage the relationship between each directory metadata in the prefix directory data table, and realize the effective maintenance of the prefix directory data table.

In an implementation of the present disclosure, the determining the matching result between the query path and the key of the prefix directory data table includes:

obtaining a prebuilt directory metadata change record table;

determining whether a directory change record corresponding to the query path exists in the directory metadata change record table;

in response to the directory change record corresponding to the query path existing in the directory metadata change record table, determining the matching result between the query path and the key of the prefix directory data table to be the unsuccessful matching.

In an embodiment of the present disclosure, the directory metadata change record table can also be maintained, a plurality of directory change records of the directory metadata are stored in the directory metadata change record table. The directory change record in the directory metadata change record table includes the directory renaming record and the directory deletion record.

In an embodiment of the present disclosure, when matching the query path with the key of the prefix directory data table, it can be implemented based on the directory metadata change record table.

Specifically, the query path can be matched in the directory metadata change record table to determine whether there are the change record of each hierarchy of the directory metadata in the query directory. If so, it is indicated that the part corresponding to the query path in the prefix directory data table has been changed, and the prefix directory data table is no longer trusted. At this time, it can directly determine that the matching result between the query path and the key of the prefix directory data table as the unsuccessful matching. In this case, after the directory metadata is queried in the full load directory data table based on the query path, the prefix directory data table can be updated to complete the prefix directory data table.

In an embodiment of the present disclosure, subpaths of all hierarchies of the query path can be determined, and then the subpaths of all hierarchies of the query path can be matched in the directory metadata change record table.

In an embodiment of the present disclosure, after obtaining the query path, when matching the query path with the key of the prefix directory data table, the subpaths of all hierarchies of the query path can be preferentially matched in the directory metadata change record table. If the directory metadata change record table has a change record of the subpath of any hierarchy of the query path, the matching result between the query path and the key of the prefix directory data table is determined as a failure matching, so as to quickly determine the matching result, and improve the processing efficiency.

In an implementation of the present disclosure, the above-mentioned method further includes:

in response to receiving an invalid entry deletion command of the prefix directory data table, acquiring the directory change record from the directory metadata change record table;

determining a change directory metadata that has occurred a change operation based on the directory change record;

determining an association path corresponding to the change directory metadata;

deleting a change entry in the prefix directory data table, where a prefix path corresponding to the change entry is the same as a prefix path of the association path.

In an embodiment of the present disclosure, the invalid entry deletion command of the prefix directory data table is used to indicate to delete an invalid entry of the prefix directory data table to ensure the validity of the prefix directory data table. The invalid entry deletion command can be initiated at a preset interval, or can be initiated after detecting that the number of entries recorded in the directory metadata change record table reaches a preset value.

Specifically, all directory change records can be read from the directory metadata change record table, and then the change directory metadata corresponding to the directory change record is determined. The association path of the change directory metadata is all the paths affected by the change directory metadata. As an example, the association path of the change directory metadata is a path that overlaps the path of the change directory metadata.

After the association path is determined, the prefix path of the association path can be extracted, and the entries of the prefix path in the prefix directory data table that are the same as those of the prefix path of the association path are determined as the change entries, and then the change entries in the prefix directory data table are deleted. After completing the deletion of invalid entries of the prefix directory data table, the directory change record of the directory metadata change record table can be deleted.

In an implementation of the present disclosure, the determining the association path corresponding to the change directory metadata includes:

searching for the association path corresponding to the change directory metadata from the prefix tree.

In an embodiment of the present disclosure, the prefix tree includes the relationship between each directory metadata in the prefix directory data table, so that the association path corresponding to the change directory metadata can be quickly queried from the prefix tree.

In an implementation of the present disclosure, the prefix directory data table, the directory metadata change record table, and the prefix tree are all stored in a cache.

In the embodiment of the present disclosure, it can improve access speed by storing all the prefix directory data table, the directory metadata change record table, and the prefix tree in the cache.

The prefix directory data table, the directory metadata change record table, and the prefix tree can be generated based on the query operation of the user on the directory metadata each time after the system is started, and be updated based on the change operation of the user on the directory metadata. Since the prefix directory data table, the directory metadata change record table, and the prefix tree are all updated in real time, the consistency between them and the full load directory data table can be effectively maintained without spending additional resources for consistency maintenance.

In an embodiment of the present disclosure, the full load directory data table may be stored persistently in the database.

As an example, FIG. 2 is a schematic diagram of a data structure involved in a solution provided by an embodiment of the present disclosure.

As shown in FIG. 2, Directory Remove History 210, i.e., a directory change history, is equivalent to the preceding directory metadata change record table. Cache Invalidator 220, i.e., an invalid cache, is equivalent to change directory metadata matched from the directory metadata change record table. Path Cache Map 230, i.e., a path cache data table, is equivalent to the above-mentioned prefix directory data table.

In this example, the prefix directory data table stores three entries: a key "/A", a value "pid: 101"; a key "/A/C", a value "pid: 102"; and a key "/B", a value "pid: 107". Prefix Tree 240, i.e., a prefix tree. Memory Hash KV Store, i.e., a hash key-value database, is equivalent to the preceding full load directory data table.

Lookup, i.e., a query operation. Check if the cache uncertain, i.e., checking whether the cache is reliable, is equivalent to determining whether the directory metadata change record table exists in the query path and its subpath. If so, it indicates that there is a directory change in the queried directory data, and the prefix directory data table in the cache is unreliable. If the directory metadata change record table does not exist in the query path and its subpath, it indicates that there no directory change in the queried directory data, and the prefix directory data table in the cache is reliable. Get remove directory, i.e., obtaining a change directory, is equivalent to determining the change directory metadata from the directory metadata change record table. Invalidate related cache, i.e., invalidating the related cache, is equivalent to invalidating the change entry associated with the change directory metadata. Build cache after cache miss, i.e., rebuilding a cache after a cache misses. In this case, all of the prefix directory data table, the directory metadata change record table, and the prefix tree can be stored in the cache, and the prefix directory data table, the directory metadata change record table, and the prefix tree can be rebuilt after the system restarts.

Figure 3:
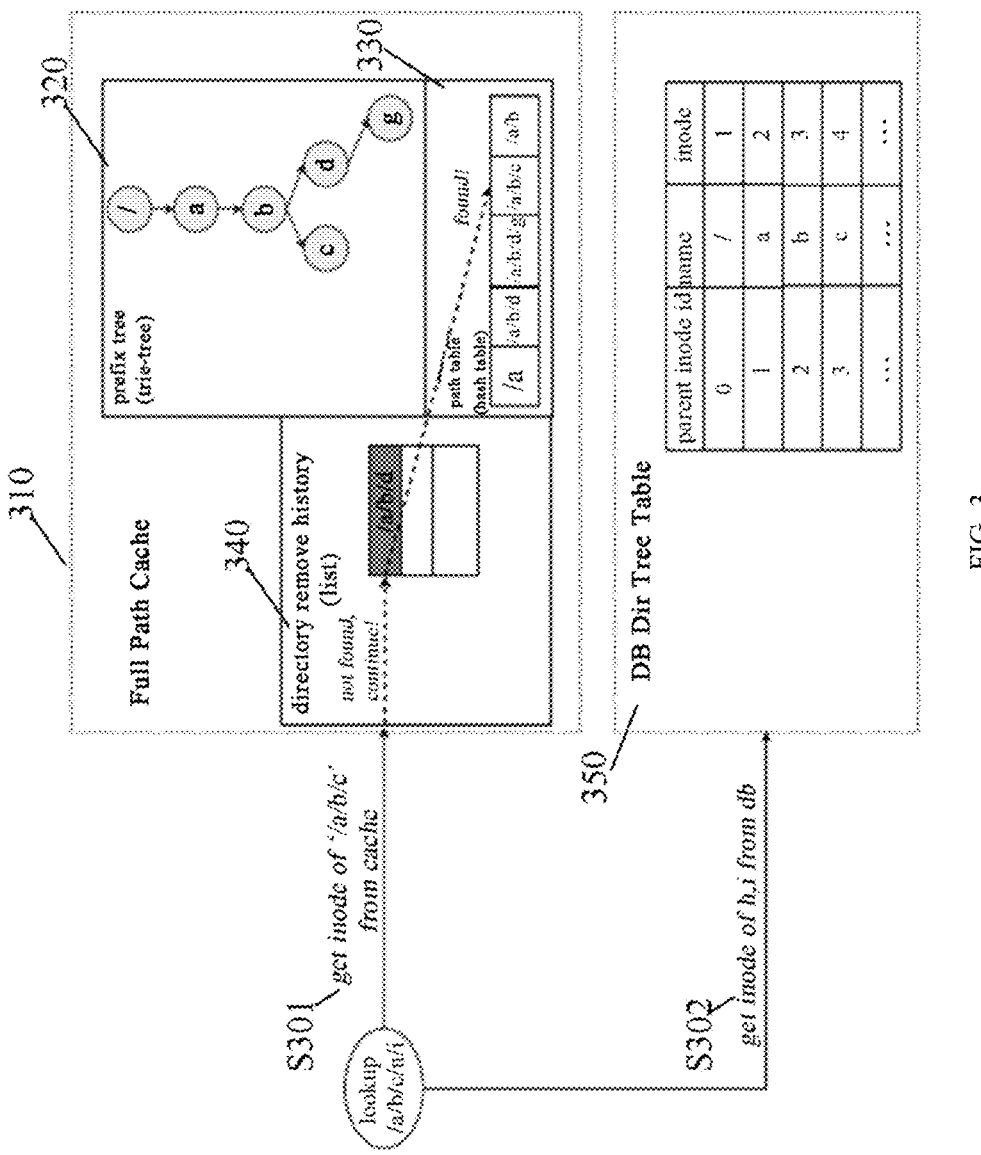
FIG. 3 is a schematic flowchart of a specific implementation of a method provided by an embodiment of the present disclosure.

As an example, FIG. 3 is schematic flowchart of a specific implementation of a method provided by an embodiment of the present disclosure.

As shown in FIG. 3, Full Path Cache 310, i.e., full path storage, is equivalent to a system cache, including the prefix directory data table, the directory metadata change record table, and the prefix tree. Prefix Tree 320, i.e., the prefix tree. In this example, the prefix tree consists of nodes a, b, c, d, and g. Directory Remove History 340, i.e., the directory change history, is equivalent to the preceding directory metadata change record table. In this example, the directory metadata change record table contains change records of directory "/a/b/d". Path Table 330, i.e., the path data table, is equivalent to the preceding prefix directory data table. In this example, the prefix directory data table stores the five entries, the keys thereof are a key "/a", a key "/a/b/d", a key "/a/b/d/d", and a key "/a/d", respectively. DB Dir Tree Table, i.e., the database of directory tree data table, is equivalent to the preceding full load directory tree data table. In this example, the full load directory data table stores five entries, the keys thereof consist of a parent index node identification (parent inode id), an index node name (name), and an index node number (inode). Where the parent inode ids are 0, 1, 2, 3 . . . , respectively; the names are/a, b, c . . . , respectively; and the inode are 1, 2, 3, 4 . . . , respectively.

When receiving a query (lookup) request send by a client, a query path "a/b/c/h/i/" is resolved. Step S301: get inode of "a/b/c" from cache, i.e., obtaining "a/b/c" from cache. Where the "a/b/c" is equivalent to the prefix path of the query path "a/b/c/h/i/". It queries whether a "a/b/c" change record exists in the directory metadata change record table. In this example, it can determine that related change record does not exist in the directory metadata change record table. Then, it can query the prefix path "a/b/c" in the prefix directory data table and find that "a/b/c" exists in the prefix directory data table.

Step S302: get inode of h, i, from db, i.e., querying "h/ic" from the database. After querying "a/b/c" from the prefix directory data table, it can obtain the identifications h, i in a subpath "/h/i/" other than the prefix path "a/b/c" in the query path "/a/b/c/h/i", and query h, i in the full load directory data table to obtain the query result.

Figure 4:
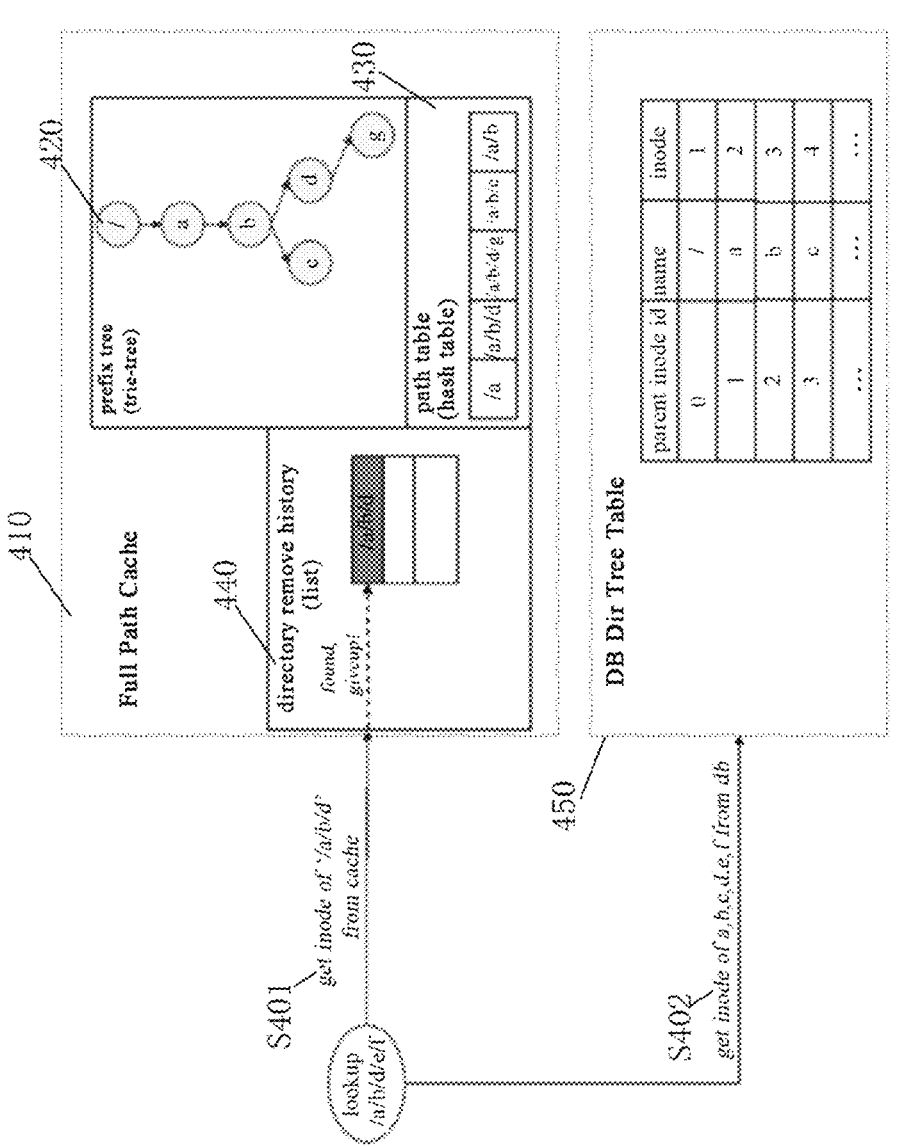
FIG. 4 is a schematic flowchart of a specific implementation of a method provided by an embodiment of the present disclosure.

As an example, FIG. 4 is a schematic flowchart of a specific implementation of a method provided by an embodiment of the present disclosure.

As shown in FIG. 4, Full Path Cache 410, i.e., full path storage, is equivalent to a system cache, including the prefix directory data table, the directory metadata change record table, and the prefix tree. Prefix Tree 420, i.e., the prefix tree. In this example, the prefix tree consists of nodes a, b, c, d, and g. Directory Remove History 440, i.e., the directory change history, is equivalent to the preceding directory metadata change record table. In this example, the directory metadata change record table contains change records of directory "/a/b/d". Path Table 430, i.e., the path data table, is equivalent to the preceding prefix directory data table. In this example, the prefix directory data table stores the five entries, the keys thereof are a key "/a", a key "/a/b/d", a key "/a/b/d/d", and a key "/a/d", respectively. DB Dir Tree Table, i.e., the database of directory tree data table, is equivalent to the preceding full load directory tree data table. In this example, the full load directory data table stores five entries, the keys thereof consist of a parent index node identification (parent inode id), an index node name (name), and an index node number (inode). Where the parent inode ids are 0, 1, 2, 3 . . . , respectively; the names are/a, b, c . . . , respectively; and the inode are 1, 2, 3, 4 . . . , respectively.

When receiving a query (lookup) request send by a client, a query path "a/b/d/e/f/" is resolved. Step S401: get inode of "a/b/d" from cache, i.e., obtaining "a/b/d" from cache. Where the "a/b/d" is equivalent to the prefix path of the query path "a/b/d/e/f/". It queries whether "a/b/d" change record exists in the directory metadata change record table. In this example, it can determine the change record of the directory metadata change record table "a/b/d". At this time, it can determine that the prefix directory data table is unreliable.

Step S402, get inode of a, b, d, e, f, from db, i.e., querying a, b, d, e, f from the database, to obtain the query result.

Figure 5:
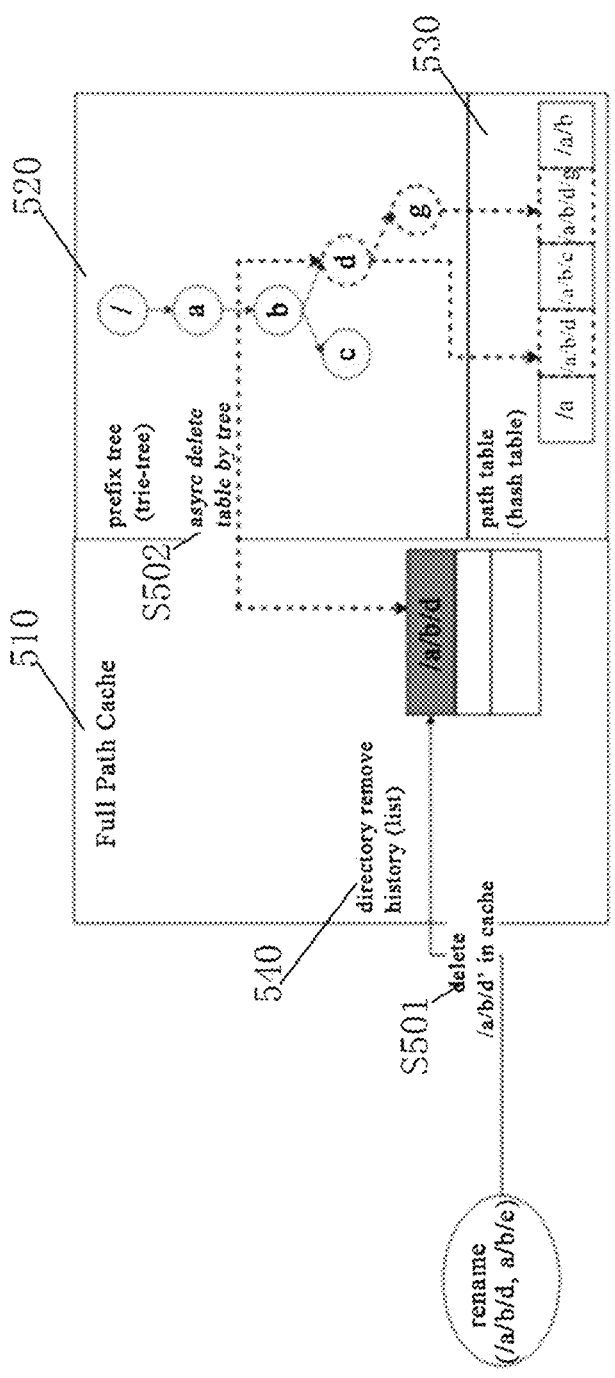
FIG. 5 is a schematic flowchart of deleting an invalid entry in a prefix directory data table in a method provided by an embodiment of the present disclosure.

As an example, FIG. 5 is a schematic flowchart of deleting an invalid entry in a prefix directory data table in a method provided by an embodiment of the present disclosure.

As shown in FIG. 5, Full Path Cache 510, i.e., full path storage, is equivalent to a system cache, including the prefix directory data table, the directory metadata change record table, and the prefix tree. Prefix Tree 520, i.e., the prefix tree. In this example, the prefix tree consists of nodes a, b, c, d, and g. Directory Remove History 540, i.e., the directory change history, is equivalent to the preceding directory metadata change record table. In this example, the directory metadata change record table contains change records of directory "/a/b/d". Path Table 530, i.e., the path data table, is equivalent to the preceding prefix directory data table. In this example, the prefix directory data table stores the five entries, the keys thereof are a key "/a", a key "/a/b/d", a key "/a/b/d/d", and a key "/a/d", respectively.

When receiving a renaming (rename) request send by a client, the pre-change directory "/a/b/d/" and the post-change directory "/a/b/e/" that the rename is directed is resolved. After a renaming operation is completed, the change records of the directory "/a/b/d/" is stored in the directory metadata change record table.

Step S501: delete/a/b/d/* in cache, i.e., deleting the directory "/a/b/d/" and its subdirectory from the cache, is equivalent to execute the operation of deleting the change entry of the prefix directory data table when executing the invalid entry deletion command.

Step S502: async delete table by tree, i.e., deleting the prefix table asynchronously based on the prefix tree. In this example, it can perform a query by the prefix tree to obtain the subdirectory of the directory "/a/b/d/" to be "/a/b/d/g". Then, the entries of the key "/a/b/d/" and the key "/a/b/d/g" can be deleted from the prefix directory data table.

Figure 6:
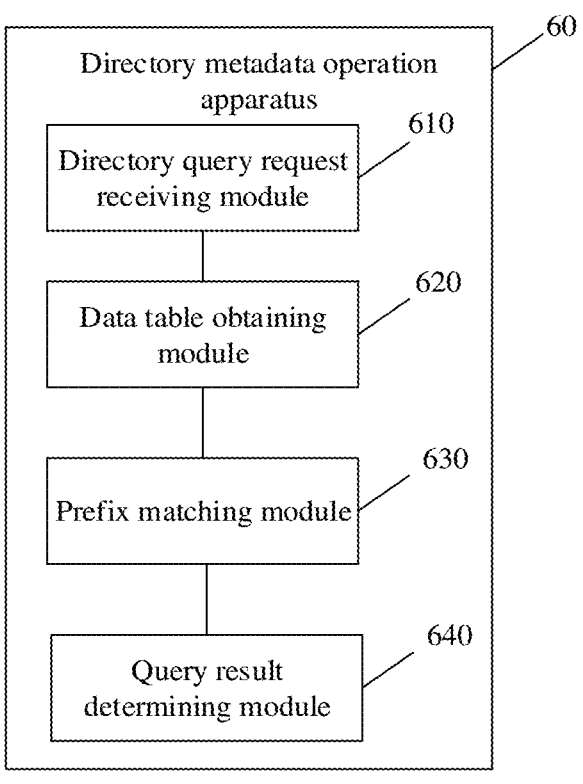
FIG. 6 is a schematic structural diagram of a directory metadata operation apparatus provided by an embodiment of the present disclosure.

Based on the same principle as the method shown in FIG. 1, FIG. 6 shows a schematic structural diagram of a directory metadata operation apparatus provided by an embodiment of the present disclosure. As shown in FIG. 6, the directory metadata operation apparatus 60 may include:

a directory query request receiving module 610, configured to, in response to receiving a directory query request, obtain a query path carried in the directory query request;

a data table obtaining module 620, configured to obtain a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

a prefix matching module 630, configured to determine a matching result between the query path and the key of the prefix directory data table;

a query result determining module 640, configured to determine a query result based on the matching result and the full load directory data table.

The apparatus provided by the embodiment of the present disclosure implements the following: in response to receiving a directory query request, obtaining a query path carried in the directory query request; obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata; determining a matching result between the query path and the key of the prefix directory data table; and determining a query result based on the matching result and the full load directory data table. In the present solution, the directory metadata operation is implemented by using the prefix directory data table and the full load directory data table, which can effectively improve the efficiency of the directory metadata operation.

In an implementation, the prefix matching module 630 is specifically configured to:

determine whether the prefix path in the key of the prefix directory data table contains a target prefix path, where the target prefix path is a subpath corresponding to a hierarchy other than a default hierarchy counting from end in the query path;

in response to the prefix path containing the target prefix path, determine the matching result to be a successful matching;

in response to the prefix path not containing the target prefix path, determine the matching result to be an unsuccessful matching.

In an implementation, the query result determining module 640 is specifically configured to:

in response to the matching result being the successful matching, determine prefix directory metadata corresponding to the target prefix path;

successively query each hierarchy of the directory metadata below the prefix directory metadata in the query path from the full load directory data table, and determine the query result.

In an implementation, the query result determining module 640 is specifically configured to:

in response to the matching result being the unsuccessful matching, query the full load directory data table based on the query path, and determine the query result.

In an implementation, the above-mentioned apparatus further includes:

a prefix directory data table entry creating module, configured to, after determining the query result, in response to the matching result being the unsuccessful matching and the query result being that the directory metadata corresponding to the query path is queried, create a corresponding entry in the prefix directory data table based on the query result.

In an implementation, the above-mentioned apparatus further includes:

a prefix tree updating module, configured to update a prebuilt prefix tree based on the query result, where the prefix tree is a subtree of a directory tree corresponding to the directory metadata in the prefix directory data table.

In an implementation, the query result determining module 640 is specifically configured to:

obtain a prebuilt directory metadata change record table;

determine whether a directory change record corresponding to the query path exists in the directory metadata change record table;

in response to the directory change record corresponding to the query path existing in the directory metadata change record table, determine the matching result between the query path and the key of the prefix directory data table to be the unsuccessful matching.

In an implementation, the directory change record in the directory metadata change record table includes a directory renaming record and a directory deletion record.

In an implementation, the above-mentioned apparatus further includes a prefix directory data table entry deleting module, where the prefix directory data table entry deleting module is specifically configured to:

in response to receiving an invalid entry deletion command of the prefix directory data table, acquire the directory change record from the directory metadata change record table;

determine a change directory metadata that has occurred a change operation based on the directory change record;

determine an association path corresponding to the change directory metadata;

delete a change entry in the prefix directory data table, where a prefix path corresponding to the change entry is the same as a prefix path of the association path.

In an implementation, the prefix directory data table entry deleting module, when determining the association path corresponding to the change directory metadata, is specifically configured to:

search for the association path corresponding to the change directory metadata from the prefix tree.

In an implementation, the prefix directory data table, the directory metadata change record table, and the prefix tree are all stored in a cache.

It is understood that the above-mentioned modules of the directory metadata operation apparatus in the embodiments of the present disclosure have functions of implementing the corresponding steps of the directory metadata operation method in the embodiment shown in FIG. 1. This function can be implemented by hardware or the hardware executing corresponding software. The hardware or the software includes one or more modules corresponding to the above-mentioned functions. The above-mentioned modules can be the software and/or the hardware, and the above-mentioned modules can be implemented individually or by integrating multiple modules. For functional description of each module of the above-mentioned directory metadata operation apparatus, it can refer to the corresponding description of the directory metadata operation method in the embodiment shown in FIG. 1, which will not be repeated here.

In the technical solution of the present disclosure, the processing such as collection, storage, use, processing, transmission, provision and disclosure of user personal information involved are comply with relevant laws and regulations, and do not violate public order and good customs.

According to embodiments of the present disclosure, the present disclosure further provides an electronic device, a readable storage medium, and a computer program product.

The electronic device includes: at least one processor; and a memory connected to the at least one processor in a communication way; where the memory stores instructions executable by the at least one processor, and the instructions, when executed by the at least one processor, enable the at least one processor to execute the directory metadata operation methods provided by the embodiments of the present disclosure.

Compared with the prior art, the electronic device implements the following: in response to receiving a directory query request, obtaining a query path carried in the directory query request; obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata; determining a matching result between the query path and the key of the prefix directory data table; and determining a query result based on the matching result and the full load directory data table. In the present solution, the directory metadata operation is implemented by using the prefix directory data table and the full load directory data table, which can effectively improve the efficiency of the directory metadata operation.

The readable storage medium is a non-transitory computer-readable storage medium that stores computer instructions, where the computer instructions are used to enable a computer to execute the directory metadata operation methods provided by the embodiments of the present disclosure.

Compared with the prior art, the readable storage medium implements the following: in response to receiving a directory query request, obtaining a query path carried in the directory query request; obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata; determining a matching result between the query path and the key of the prefix directory data table; and determining a query result based on the matching result and the full load directory data table. In the present solution, the directory metadata operation is implemented by using the prefix directory data table and the full load directory data table, which can effectively improve the efficiency of the directory metadata operation.

The computer program product includes a computer program, where the computer program, when executed by a processor, implements the directory metadata operation methods provided by the embodiments of the present disclosure.

Compared with the prior art, the computer program product implements the following: in response to receiving a directory query request, obtaining a query path carried in the directory query request; obtaining a prebuilt prefix directory data table and a prebuilt full load directory data table, where a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata; determining a matching result between the query path and the key of the prefix directory data table; and determining a query result based on the matching result and the full load directory data table. In the present solution, the directory metadata operation is implemented by using the prefix directory data table and the full load directory data table, which can effectively improve the efficiency of the directory metadata operation.

Figure 7:
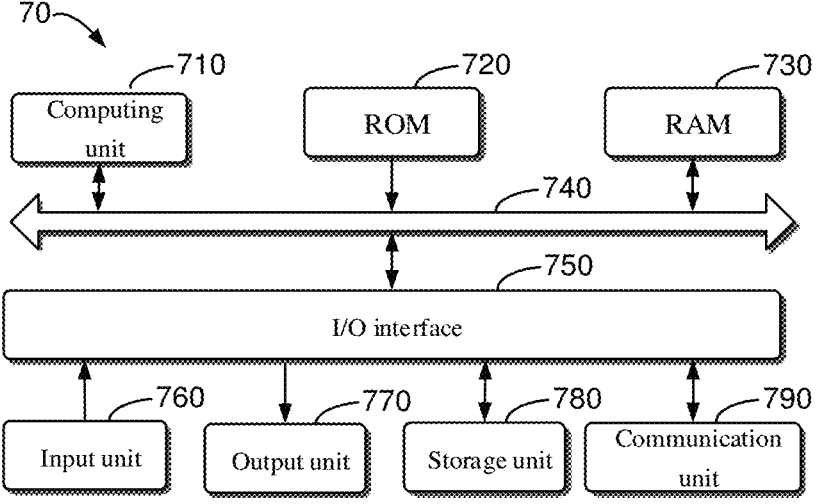
FIG. 7 is a block diagram of an electronic device configured to implement a directory metadata operation method of an embodiment of the present disclosure.

FIG. 7 shows a block diagram of an electronic device 70 configured to implement a directory metadata operation method of an embodiment of the present disclosure. The electronic device 70 is intended to represent various forms of digital computers, such as a laptop computer, a desktop computer, a workstation, a personal digital assistant, a server, a blade server, a mainframe computer, and other suitable computers. The electronic device 70 can also represent various forms of mobile apparatuses, such as a personal digital assistant, a cellular phone, a smart phone, a wearable device, and other similar computing apparatuses. The components, their connections and relationships, and their functions shown herein are merely examples and are not intended to limit the implementation of the present disclosure described and/or required herein.

As shown in FIG. 7, the electronic device 70 includes a computing unit 710 that can execute various appropriate actions and processes based on computer programs stored in a read-only memory (ROM) 720 or computer programs loaded from a storage unit 780 into a random access memory (RAM) 730. In the RAM 730, various programs and data required for the operation of the electronic device 70 can also be stored. The computing unit 710, the ROM 720, and the RAM 730 are connected to each other via a bus 740. An input/output (I/O) interface 750 is also connected to the bus 740.

A number of components in the electronic device 70 are connected to the I/O interface 750, including: an input unit 760, such as a keyboard, a mouse, etc.; an output unit 770, such as various types of displays, speakers, etc.; the storage unit 780, such as a disk, an optical disk, etc.; and a communication unit 790, such as a network card, a modem, a wireless communication transceiver, etc. The communication unit 790 allows the electronic device 70 to exchange information/data with other devices through a computer network, such as the Internet and/or various telecommunications networks.

The computing unit 710 may be a variety of general and/or special processing components with processing and computing capabilities. Some examples of the computing unit 710 include, but are not limited to, a central processing unit (CPU), a graphics processing unit (GPU), various specialized artificial intelligence (AI) computing chips, various computing units running machine learning model algorithms, a digital signal processor (DSP), and any appropriate processors, controllers, microcontrollers, etc. The computing unit 710 executes the directory metadata operation methods provided in embodiments of the present disclosure. For example, in some embodiments, the computing unit 710 can be may be implemented as a computer software program for executing the directory metadata operation methods provided in the embodiments of the present disclosure, which is tangibly contained in a machine readable medium, such as the storage unit 780. In some embodiments, part or all of the computer program may be loaded and/or installed in the electronic device 70 via the ROM 720 and/or the communication unit 790. When the computer program is loaded into the RAM 730 and executed by the computing unit 710, one or more steps of the directory metadata operation methods provided in embodiments of the present disclosure may be executed. Alternatively, in other embodiments, the computing unit 710 may be configured to execute the directory metadata operation methods provided in embodiments of the present disclosure by any other appropriate manner (e.g., by means of firmware).

Various implementations of the system and the technologies described above herein can be implemented in a digital electronic circuit system, an integrated circuit system, a field programmable gate array (FPGA), an application specific integrated circuit (ASIC), an application-specific standard product (ASSP), a system-on-chip system (SOC), a load programmable logic device (CPLD), computer hardware, firmware, software, and/or a combination thereof. These various implementations may include: being implemented in one or more computer programs, where the one or more computer programs can be executed and/or interpreted in a programmable system including at least one programmable processor, where programmable processor can be a specialized or a general purpose programmable processor that can receive data and an instruction from a storage system, at least one input apparatus, and at least one output apparatus, and transmit the data and the instruction to the storage system, the at least one input apparatus, and the at least one output apparatus.

A program code for implementing the method of the present disclosure may be written in any combination of one or more programming languages. These program codes may be provided to a processor or controller of a general-purpose computer, a special-purpose computer or other programmable data processing apparatuses, so that the program code, when executed by the processor or the controller, implements the functions/operations specified in the flowchart diagram and/or the block diagram. The program code can be executed entirely in a machine, partially in the machine, and partially in a remote machine and partially in the machine as an independent software package, or completely in the remote machine or a server.

In the context of the present disclosure, a machine readable medium may be a tangible medium that may contain or store programs for use by, or in conjunction with, an instruction execution system, an apparatus, or a device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the above. A more specific example of the machine readable storage medium includes an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

In order to provide interaction with a user, the system and technology described herein can be implemented in a computer, where the computer includes: a display apparatus (e.g., a CRT (cathode ray tube) or a LCD (liquid crystal display) monitor) for displaying information to a user; and a keyboard and a pointing apparatus (e.g., a mouse or a trackball) through which the user can provide input to the computer.

Other types of apparatuses can also be used to provide interaction with the user; for example, feedback provided to the user can be any form of sensory feedback (e.g., visual feedback, auditory feedback, or tactile feedback); and input from the user can be received in any form (including acoustic input, voice input, or tactile input).

The system and the technology described herein may be implemented in a computing system that includes back-end components (e.g., as a data server), or a computing system that includes middleware components (e.g., an application server), or a computing system that includes front-end components (e.g., a user computer with a graphical user interface or a web browser, where a user can interact with the implementation of the system and the technology described herein by the graphical user interface or the web browser), or a computing system that includes any combination of the back-end components, the middleware components, or the front-end components. The components of the system can be interconnected by any form or medium of digital data communication (e.g., a communication network). Examples of communication network include the local area network (LAN), the wide area network (WAN), and the Internet.

A computer system may include a client and a server. The client and the server are generally far away from each other and usually interact with each other through a communication network. The relationship between the client and the server is generated by computer programs running in respective computers and having a client-server relationship with each other. The server may be a cloud server, a server of a distributed system, or a server combined with a blockchain.

It should be understood that steps can be reordered, added, or removed by using the various forms of procedures as described above. For example, each steps recorded in the present disclosure can be performed in parallel, sequentially, or in different orders, as long as the desired results of the technical solutions disclosed in the present disclosure can be achieved, which is not limited herein.

The above-mentioned specific implementation does not constitute a limitation on the protection scope of the present disclosure. Persons of ordinary skill in the art should understand that various modifications, combinations, sub-combinations, and substitutions may be made depending on design requirements and other factors. Any modification, equivalent replacement, improvement, etc. made within the spirit and principles of the present disclosure shall be included in the protection scope of the present disclosure.

What is claimed is:

1. A directory metadata operation method, comprising:
in response to receiving a directory query request, obtaining a query path carried in the directory query request;
obtaining a prebuilt prefix directory data table and a prebuilt full load directory data table, wherein a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;
determining a matching result between the query path and the key of the prefix directory data table;
determining a query result based on the matching result and the full load directory data table;
wherein the determining the matching result between the query path and the key of the prefix directory data table comprises:
determining whether the prefix path in the key of the prefix directory data table contains a target prefix path, wherein the target prefix path is a subpath corresponding to a hierarchy other than a default hierarchy counting from end in the query path;
in response to the prefix path containing the target prefix path, determining the matching result to be a successful matching;
in response to the prefix path not containing the target prefix path, determining the matching result to be an unsuccessful matching,
wherein in response to the matching result being the successful matching, the determining the query result based on the matching result and the full load directory data table comprises:
determining prefix directory metadata corresponding to the target prefix path;

successively querying each hierarchy of the directory metadata below the prefix directory metadata in the query path from the full load directory data table, and determining the query result.

2. The method according to claim 1, wherein in response to the matching result being the unsuccessful matching, the determining the query result based on the matching result and the full load directory data table comprises:

querying the full load directory data table based on the query path, and determining the query result.

3. The method according to claim 1, after determining the query result, the method further comprising:

in response to the matching result being the unsuccessful matching and the query result being that the directory metadata corresponding to the query path is queried, creating a corresponding entry in the prefix directory data table based on the query result.

4. The method according to claim 3, further comprising:

updating a prebuilt prefix tree based on the query result, wherein the prefix tree is a subtree of a directory tree corresponding to the directory metadata in the prefix directory data table.

5. The method according to claim 4, wherein the determining the matching result between the query path and the key of the prefix directory data table comprises:

obtaining a prebuilt directory metadata change record table;

determining whether a directory change record corresponding to the query path exists in the directory metadata change record table;

in response to the directory change record corresponding to the query path existing in the directory metadata change record table, determining the matching result between the query path and the key of the prefix directory data table to be the unsuccessful matching.

6. The method according to claim 5, wherein the directory change record in the directory metadata change record table comprises a directory renaming record and a directory deletion record.

7. The method according to claim 5, further comprising:

in response to receiving an invalid entry deletion command of the prefix directory data table, acquiring the directory change record from the directory metadata change record table;

determining a change directory metadata that has occurred a change operation based on the directory change record;

determining an association path corresponding to the change directory metadata;

deleting a change entry in the prefix directory data table, wherein a prefix path corresponding to the change entry is the same as a prefix path of the association path.

8. The method according to claim 7, wherein the determining the association path corresponding to the change directory metadata comprises:

searching for the association path corresponding to the change directory metadata from the prefix tree.

9. The method according to claim 5, wherein the prefix directory data table, the directory metadata change record table, and the prefix tree are all stored in a cache.

10. A directory metadata operation apparatus, comprising:

at least one processor; and a memory connected to the at least one processor in a communication way;

wherein the memory stores instructions executable by the at least one processor, to:

in response to receiving a directory query request, obtain a query path carried in the directory query request;

obtain a prebuilt prefix directory data table and a prebuilt full load directory data table, wherein a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

determine a matching result between the query path and the key of the prefix directory data table;

determine a query result based on the matching result and the full load directory data table;

wherein to determine the matching result between the query path and the key of the prefix directory data table, the at least one processor is further caused to:

determine whether the prefix path in the key of the prefix directory data table contains a target prefix path, wherein the target prefix path is a subpath corresponding to a hierarchy other than a default hierarchy counting from end in the query path;

in response to the prefix path containing the target prefix path, determine the matching result to be a successful matching;

in response to the prefix path not containing the target prefix path, determine the matching result to be an unsuccessful matching;

wherein in response to the matching result being the successful matching, the at least one processor is further caused to determine prefix directory metadata corresponding to the target prefix path; and successively query each hierarchy of the directory metadata below the prefix directory metadata in the query path from the full load directory data table, and determine the query result.

11. The apparatus according to claim 10, wherein the at least one processor is further caused to:

in response to the matching result being the unsuccessful matching, query the full load directory data table based on the query path, and determine the query result.

12. The apparatus according to claim 10, wherein the at least one processor is further caused to:

after determining the query result, in response to the matching result being the unsuccessful matching and the query result being that the directory metadata corresponding to the query path is queried, create a corresponding entry in the prefix directory data table based on the query result.

13. The apparatus according to claim 12, wherein the at least one processor is further caused to:

update a prebuilt prefix tree based on the query result, wherein the prefix tree is a subtree of a directory tree corresponding to the directory metadata in the prefix directory data table.

14. The apparatus according to claim 13, wherein the at least one processor is further caused to:

obtain a prebuilt directory metadata change record table;

determine whether a directory change record corresponding to the query path exists in the directory metadata change record table;

in response to the directory change record corresponding to the query path existing in the directory metadata change record table, determine the matching result between the query path and the key of the prefix directory data table to be the unsuccessful matching.

15. The apparatus according to claim 14, wherein the at least one processor is further caused to:

in response to receiving an invalid entry deletion command of the prefix directory data table, acquire the directory change record from the directory metadata change record table;

determine a change directory metadata that has occurred a change operation based on the directory change record;

determine an association path corresponding to the change directory metadata;

delete a change entry in the prefix directory data table, wherein a prefix path corresponding to the change entry is the same as a prefix path of the association path;

wherein when determining the association path corresponding to the change directory metadata, the at least one processor is further caused to:

search for the association path corresponding to the change directory metadata from the prefix tree.

16. A non-transitory computer-readable storage medium, storing computer instructions which are executable by at least one processor to:

in response to receiving a directory query request, obtain a query path carried in the directory query request;

obtain a prebuilt prefix directory data table and a prebuilt full load directory data table, wherein a key of the prefix directory data table is a prefix path of directory metadata, the prefix path is a subpath corresponding to a hierarchy other than a default hierarchy counting from end in a path corresponding to the directory metadata, a value of the prefix directory data table is the directory metadata, a key of the full load directory data table is identification information of the directory metadata, and a value of the full load directory data table is the directory metadata;

determine a matching result between the query path and the key of the prefix directory data table;

determine a query result based on the matching result and the full load directory data table;

wherein to determine the matching result between the query path and the key of the prefix directory data table, the computer instructions are executable by at least one processor to:

determine whether the prefix path in the key of the prefix directory data table contains a target prefix path, wherein the target prefix path is a subpath corresponding to a hierarchy other than a default hierarchy counting from end in the query path;

in response to the prefix path containing the target prefix path, determine the matching result to be a successful matching;

in response to the prefix path not containing the target prefix path, determine the matching result to be an unsuccessful matching;

wherein in response to the matching result being the successful matching, the computer instructions are executable by the at least one processor to determine prefix directory metadata corresponding to the target prefix path; and successively query each hierarchy of the directory metadata below the prefix directory metadata in the query path from the full load directory data table, and determine the query result.

* * * * *